(12) United States Patent
Suzuki et al.

(10) Patent No.: US 9,751,576 B2
(45) Date of Patent: Sep. 5, 2017

(54) SEALING DEVICES FOR ANTI-FRICTION BEARING

(71) Applicant: NTN CORPORATION, Osaka (JP)

(72) Inventors: Takayuki Suzuki, Mie (JP); Hiroyuki Miyazaki, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/022,259

(22) PCT Filed: Sep. 19, 2014

(86) PCT No.: PCT/JP2014/074921
§ 371 (c)(1),
(2) Date: Mar. 16, 2016

(87) PCT Pub. No.: WO2015/041337
PCT Pub. Date: Mar. 26, 2015

(65) Prior Publication Data
US 2016/0229470 A1    Aug. 11, 2016

(30) Foreign Application Priority Data

Sep. 20, 2013 (JP) ................................. 2013-195359

(51) Int. Cl.
*F16C 33/78* (2006.01)
*B62D 55/088* (2006.01)
(Continued)

(52) U.S. Cl.
CPC .......... *B62D 55/088* (2013.01); *F16C 33/783* (2013.01); *F16C 33/7823* (2013.01);
(Continued)

(58) Field of Classification Search
CPC   F16C 33/7813; F16C 33/7823; F16C 33/783; F16C 33/7889; F16C 33/7896;
(Continued)

(56) References Cited

U.S. PATENT DOCUMENTS 2,003,605 A    6/1935  Oelkers
2,945,730 A *  7/1960  Murray ............... F16C 33/6674
                                                    277/420
(Continued)

FOREIGN PATENT DOCUMENTS

DE    689 03 331    3/1993
EP    0 128 877    12/1984
(Continued)

OTHER PUBLICATIONS

International Search Report issued Dec. 16, 2014 in corresponding International Application No. PCT/JP2014/074921.
(Continued)

*Primary Examiner* — Thomas R. Hannon
(74) *Attorney, Agent, or Firm* — Wenderoth, Lind & Ponack, L.L.P.

(57) ABSTRACT

A rolling-bearing sealing device includes: an outer ring fixed to a rotating sprocket housing; an inner ring fixed to a non-rotating motor housing; a plurality of rolling elements between the outer and the inner rings; a retainer holding the rolling elements; and an oil seal including a slinger and a seal lip and fixed to the inner ring, in which a radial lip of the oil seal is pressed against the outer ring or the sprocket housing, and in which the sprocket housing has an end face provided with a side plate fixed thereto, for sliding contact by a side lip extended axially from the oil seal.

5 Claims, 7 Drawing Sheets

(51) Int. Cl.
*F16C 33/80* (2006.01)
*F16J 15/16* (2006.01)
*F16J 15/3256* (2016.01)
*F16C 43/04* (2006.01)
*F16C 19/36* (2006.01)

(52) U.S. Cl.
CPC ...... *F16C 33/7873* (2013.01); *F16C 33/7879* (2013.01); *F16C 33/7889* (2013.01); *F16C 33/805* (2013.01); *F16C 43/045* (2013.01); *F16J 15/164* (2013.01); *F16J 15/3256* (2013.01); *F16C 19/364* (2013.01); *F16C 33/7813* (2013.01); *F16C 33/7896* (2013.01); *F16C 2326/20* (2013.01); *F16C 2350/26* (2013.01)

(58) Field of Classification Search
CPC ..... F16C 33/805; F16C 43/045; F16J 15/164; F16J 15/3256; B62D 55/088; B62D 55/0887
See application file for complete search history.

(56) References Cited

U.S. PATENT DOCUMENTS

| | | | | |
|---|---|---|---|---|
| 2,990,220 | A | * | 6/1961 | Malone ................. B62D 55/15 277/562 |
| 3,049,357 | A | | 8/1962 | Kosatka |
| 3,828,411 | A | * | 8/1974 | Zahn ................. F16C 33/7889 29/898.11 |
| 4,043,620 | A | * | 8/1977 | Otto ...................... F16C 33/726 277/371 |
| 4,640,559 | A | | 2/1987 | Crotti |
| 5,135,236 | A | * | 8/1992 | Kruk ................... F16C 33/7813 277/572 |
| 6,471,211 | B1 | * | 10/2002 | Garnett .................. F16C 19/34 277/351 |
| 2007/0286542 | A1 | * | 12/2007 | Bober ................ F16C 33/7813 384/485 |
| 2009/0127796 | A1 | | 5/2009 | Kanzaki et al. |
| 2013/0077905 | A1 | | 3/2013 | Shimizu et al. |

FOREIGN PATENT DOCUMENTS

| | | |
|---|---|---|
| EP | 0 378 939 | 7/1990 |
| JP | 59-93573 | 5/1984 |
| JP | 2002-328133 | 11/2002 |
| JP | 2006-10056 | 1/2006 |
| JP | 2006-10057 | 1/2006 |
| JP | 2006-342828 | 12/2006 |
| JP | 2008-8458 | 1/2008 |
| JP | 2011-256895 | 12/2011 |

OTHER PUBLICATIONS

International Preliminary Report on Patentability issued Mar. 22, 2016 in corresponding International Application No. PCT/JP2014/074921.

Extended European Search Report dated Apr. 24, 2017 in corresponding European Application No. 14845301.2.

* cited by examiner

SEALING DEVICES FOR ANTI-FRICTION BEARING

TECHNICAL FIELD

The present invention relates to a rolling-bearing sealing device which includes a rolling bearing and an oil seal integrated with each other.

BACKGROUND ART

Figure 6:
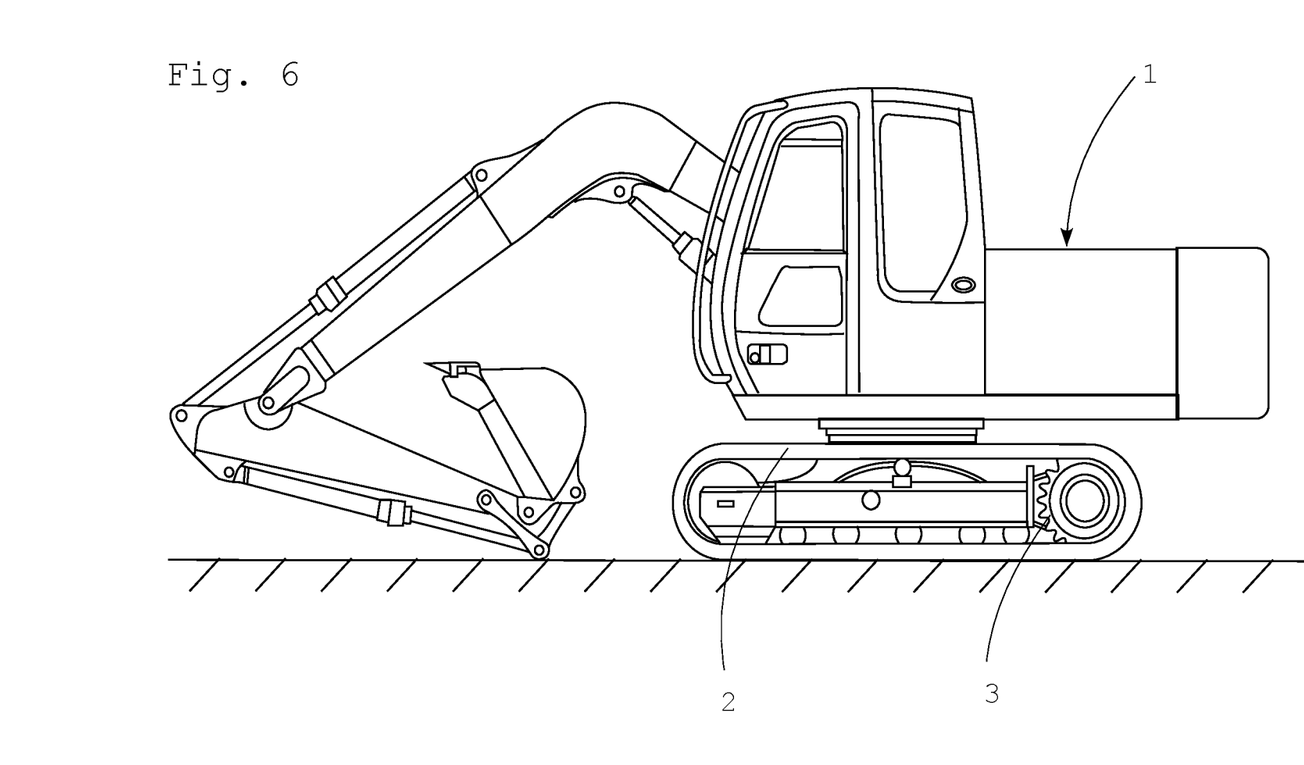
FIG. 6 is a side view showing an example of a crawler type traveling unit.
Figure 7:
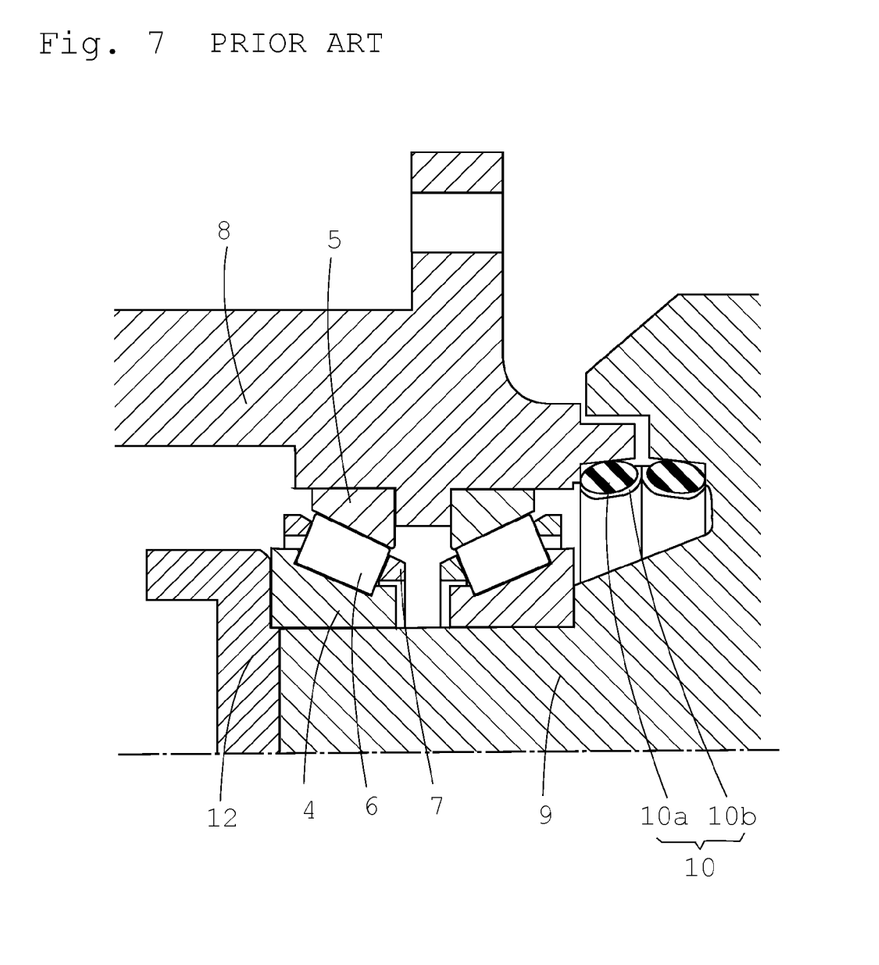
FIG. 7 is a partial sectional view of a conventional rolling-bearing sealing device.

FIG. 6 shows a hydraulic excavator as an example of construction machine 1 equipped with a crawler type traveling unit 2 which includes a speed reducer having a sprocket 3 provided with bearings shown in FIG. 7. Two tapered roller bearings are used, each having: an inner ring 4; an outer ring 5; a plurality of rolling elements 6 between the two rings; and a retainer 7 holding the rolling elements 6. The two tapered roller bearings are aligned with their smaller flanges of the inner rings 4 facing each other. Also, the bearings are axially positioned by a holding plate 12.

In this sprocket bearing, the outer ring 5 is fixed to a sprocket housing 8, and rotates integrally with the sprocket housing 8.

On the other hand, the inner ring 4 of the sprocket bearing is fixed to a motor housing 9 which does not rotate.

The sprocket has sealing function to keep internal lubricant and to prevent external soil from entering.

Conventionally, a floating seal 10, which is a separate member from the bearing, is used for the sprocket bearing (Patent Literature 1).

This floating seal 10 makes use of two rubber members 10a for establishing elastic contact of a seal ring 10b thereby holding internal lubricant.

CITATION LIST

Patent Literature

Patent literature 1: JP-A S59-93573

SUMMARY OF INVENTION

Technical Problem

The floating seal 10 does not have good assemblability; when assembling the rubber members 10a to the motor housing 9 and the sprocket housing 8, height and angle of the seal ring 10b must be carefully controlled to ensure good sealing.

Poor sealing can cause leaking of internal lubricant and external soil entry, and results in insufficient lubrication in the speed reducer and the bearing.

The sprocket bearing may be provided by a conventional bearing in which its inner ring, outer ring, rolling elements, retainer, and seal are integrally assembled with each other. However, this does not provide enough sealing against external soil entry.

Moreover, the sealed bearing makes use of a shield plate, oil seal, high pack seal, triple lip seal, etc.; its inner ring and outer ring are inseparable, and thus it is difficult to assemble and disassemble.

Therefore, an objective of the present invention is to provide a rolling-bearing sealing device which can be assembled and disassembled easily, keep internal lubricant, and prevent external soil entry.

Solution to Problem

In order to solve the problem described above, the present invention provides a rolling-bearing sealing device which includes an outer ring fixed to a rotating sprocket housing; an inner ring fixed to a non-rotating motor housing; a plurality of rolling elements between the outer and the inner rings; a retainer holding the rolling elements; and an oil seal including a slinger and a seal lip and fixed to the inner ring. With this arrangement, the seal lip of the oil seal is press-fitted onto the outer ring or the sprocket housing for sealing a bearing space between the outer and the inner rings.

The sprocket housing may have an inner diameter surface provided with a sleeve for sliding contact by a seal lip extended radially from the oil seal.

The sprocket housing may have an end face provided with a side plate fixed thereto, for sliding contact by a seal lip extended axially from the oil seal.

The inner ring may have an axial end portion formed with a step, so that the step forms a labyrinth seal between itself and an inner diameter end of the side plate.

The side plate may have a surface provided with a resin sliding member bonded thereto for contact between the inner ring and the side plate.

The side plate may be bolted to an end face of the sprocket housing, to position the side plate.

The side plate may be omitted if the outer ring is axially extended, the extension is fitted with an L-shaped sleeve, and the sleeve's annular face is in sliding contact with a seal lip extended axially from the oil seal.

Advantageous Effects of Invention

According to the present invention, an oil seal is integrated with an inner ring. This makes easy assembling and disassembling, and makes it possible to keep internal lubricant, and prevent external soil entry.

DESCRIPTION OF EMBODIMENTS

Figure 1:
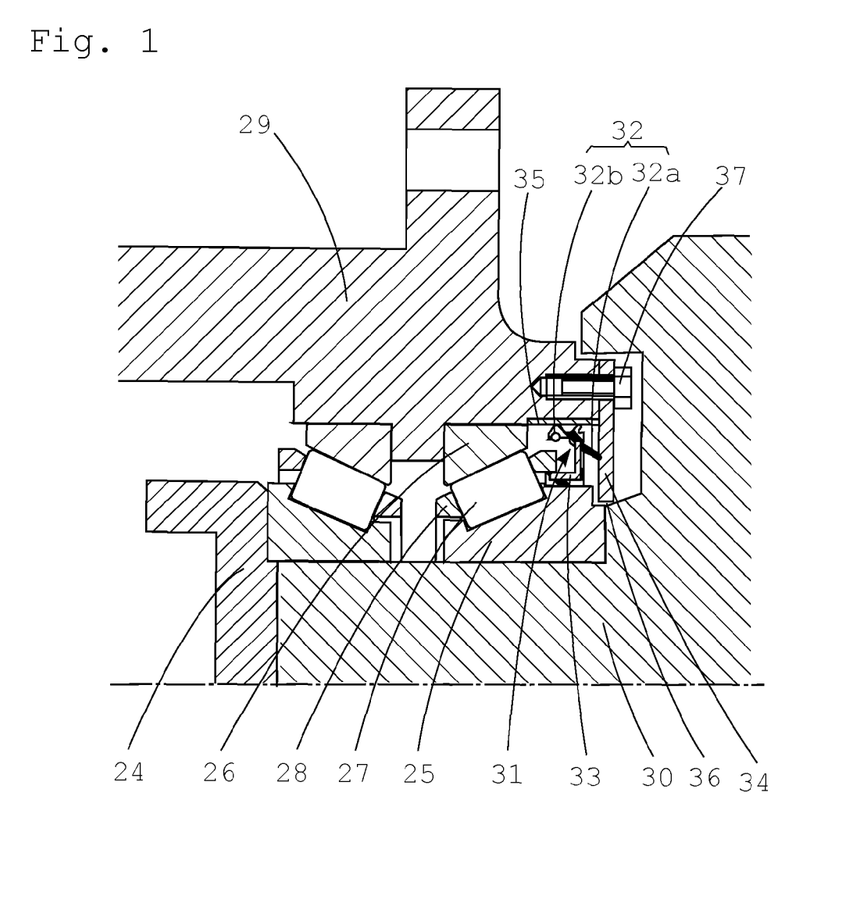
FIG. 1 is a partial sectional view of a rolling-bearing sealing device according to a first embodiment of the present invention.
Figure 2:
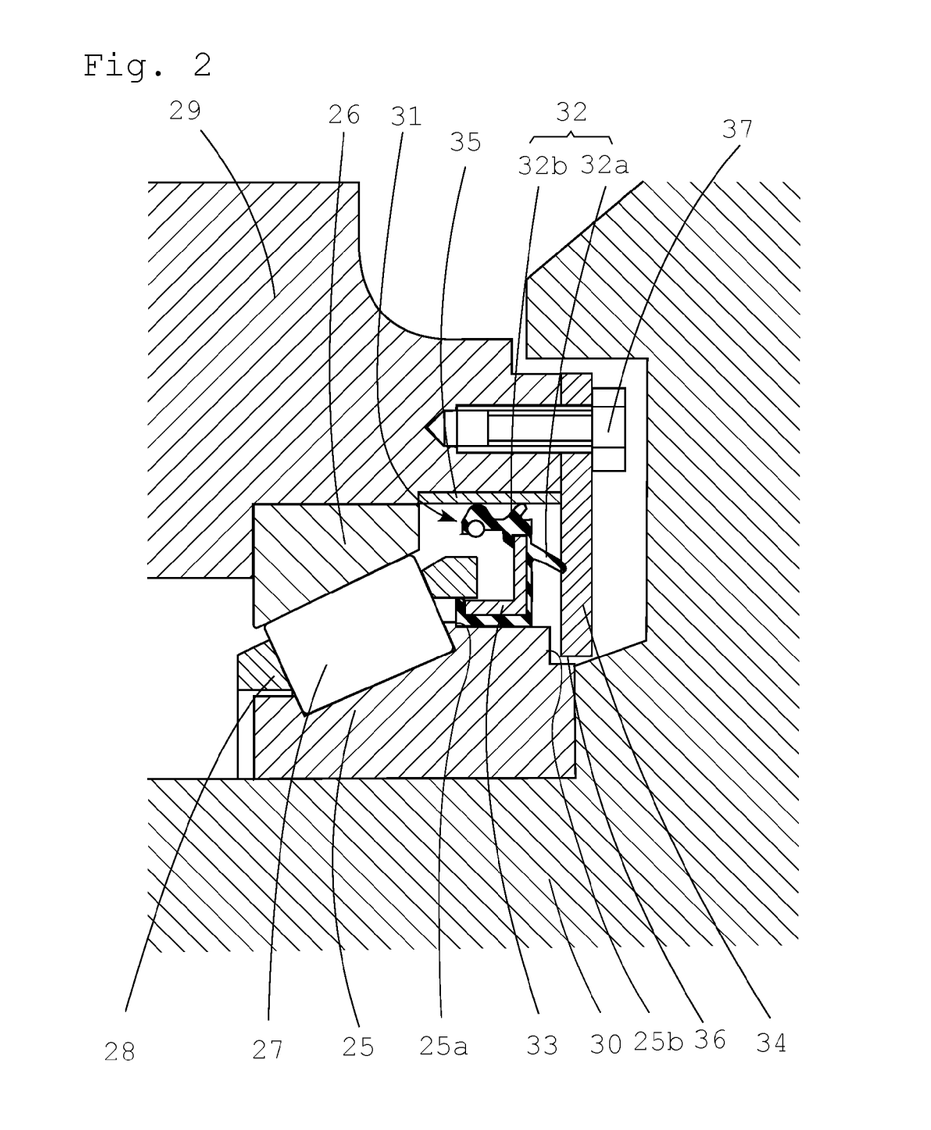
FIG. 2 is a partial enlargement of FIG. 1.

Hereinafter, embodiments of the present invention will be described in detail with reference to the attached drawings. FIG. 1 and FIG. 2 shows an embodiment of a sprocket bearing, utilizing two tapered roller bearings, each including an inner ring 25, an outer ring 26, a plurality of rolling elements 27 between the two rings, and a retainer 28 holding the rolling elements 27. The two tapered roller bearings are aligned with their smaller flanges of the inner rings 25 facing each other. Also, the bearing is axially positioned by a holding plate 24.

In this sprocket bearing, the outer ring 26 is fixed to a sprocket housing 29, and rotates integrally with the sprocket housing 29.

On the other hands, the inner ring 25 of the sprocket bearing are fixed to a motor housing 30 which does not rotate.

In the sprocket bearing, the inner rings 25 and the outer rings 26 must be separable from each other since they are assembled independently when attached to a traveling unit. Therefore, in the present invention, an oil seal 31, which has an outward facing seal lip 32, is integrated to larger flange of the inner ring 25. Integration with the inner ring 25 eliminates positioning and other management, and results in improved assemblability.

The seal lip 32 of the oil seal 31 has a sliding surface on the rotational side, i.e. the side of sprocket housing 29, to ensure good sealing in the rotation of the outer ring 26.

The oil seal 31 includes: an L-shaped slinger 33 fixed to the outer diameter surface of the inner ring 25; and a seal lip 32 fixed to the slinger 33. The seal lip 32 includes axially protruding side lip 32a, and two radial lips 32b protruding radially outward.

An annular sleeve 35 is fitted to the inner-diameter surface of the sprocket housing 29 in order to prevent the sprocket housing 29 from wear caused by sliding movement with the two radial lips 32b which protrudes radially outward, and to prevent internal-lubricant from leaking.

On the outer end surface of the sprocket housing 29, a side plate 34 is fixed with bolts 37 for sliding contact with the side lip 32a of the seal lip 32.

The side plate 34 extends into the motor housing 30, forming a gap 36 which serves as a labyrinth seal between an inner diameter end surface of the side plate 34 and the outer diameter surface of the motor housing 30. This keeps the soil, dirt, and water out of the side plate 34.

The outer diameter surface of the inner ring 25 has a first step 25a for positioning and fixing the oil seal 31; and a second step 25b in the gap 36 to form a labyrinth seal between itself and the side plate 34. The second step 25b helps water and dirt escape along the second step 25b even if they happens to enter the side plate 34.

The steps formed on the outer diameter surface of the inner ring 25 decreases the width of the larger flange of inner ring 25, and decreases strength. This problem is solved by fitting the oil seal 31 to the first step 25a. In other words, the inner ring 25 and the oil seal 31 integrally provides a sufficient inner ring width which satisfies required strength of the large flange of the inner ring 25.

The second step forms a labyrinth between the inner ring and the side plate to prevent external soil from entering. In addition, when the bearing is assembled, the second step makes contact with the side plate, thereby preventing the inner ring parts from dropping, and preventing the side lip from excess deformation.

The annular sleeve 35 is fitted to the inner diameter surface of the sprocket housing 29. The sleeve 35 serves as a member which makes sliding contact with the oil seal 31. Therefore, there is no need to reduce surface coarseness of the inner diameter surface of the sprocket housing 29. The sliding surface of the sleeve 35 is polished to a coarseness of Ra 0.1 to 0.6 μm. The sleeve 35 does not make contact with the radial lip 32b directly, but via an oil layer between them. The oil in the layer is circulating from inside of the body of lubricant to outside (atmosphere), and from the outside to the inside lubricant, following pressure distribution changes around the radial lip 32b, to provide sealing. Also, the oil layer prevents the radial lip 32b and the sleeve 35 from contacting directly in their sliding surfaces. This prevents wear and seize of the radial lip 32b. The finish to the coarseness range between Ra 0.1 to 0.6 μm leaves discontinuous machining marks essentially perpendicular to the axis, so that internal lubricant is not likely to leak. If the coarseness is smaller than Ra 0.1 μm, the machining marks are oblique to the axis, and continuous from inside to outside of the oil seal, so that the lubricant leaks along the groove of the marks. On the other hand, if the coarseness is greater than Ra 0.6 μm, the lubricant leaks along the deep groove of the marks, resulting in a thinner oil layer which affects the sliding surface and seize the radial lip 32b.

The radial lip 32b wears its counterpart as it makes sliding contact therewith. Therefore, the sleeve 35 is provided as a replaceable part to prevent the sprocket housing 29 from wearing.

The first step 25a described above axially positions the oil seal 31 in the inner ring 25. This maintains a margin between the side plate 34 and the side lip 32a without interfering with the retainer 28 even in a case where the oil seal 31 is pushed by external soil.

As described above, the sprocket bearing according to the embodiment shown in FIG. 1 and FIG. 2 has an integrated sealing device, and therefore improves sealing of the device and assemblability of the sealing device.

FIG. 3 shows an assembling procedure of the sprocket bearing according to the embodiment shown in FIG. 1 and FIG. 2.

Figure 3A:
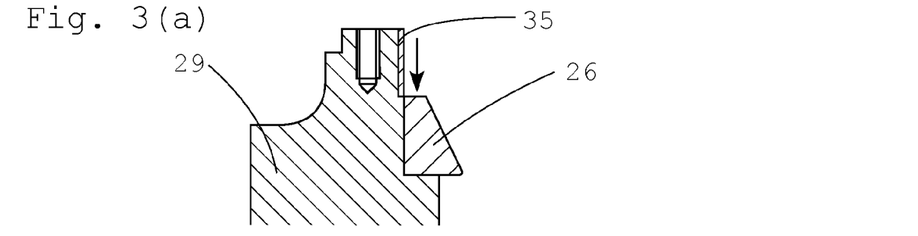
FIGS. 3(a)-3(d) are sectional views showing an assembling procedure for the rolling-bearing sealing device shown in FIG. 1.

First, as shown in FIG. 3(a), the annular sleeve 35 and the outer ring 26 are fitted to the inner diameter surface of the sprocket housing 29.

Figure 3B:
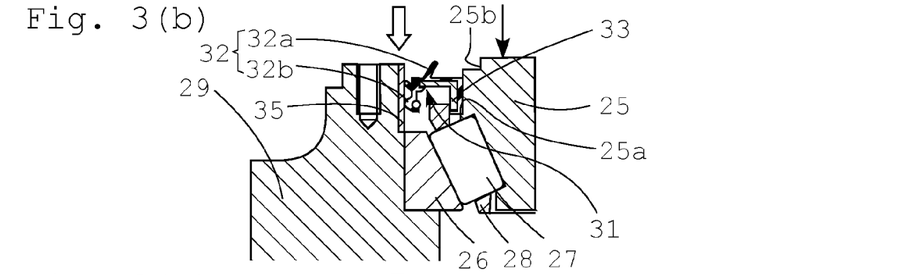

Then, as shown in FIG. 3(b), the rolling elements 27 which are held by the retainer 28, and the inner ring 25 which incorporates the oil seal 31 are assembled to the outer ring 26.

Figure 3C:
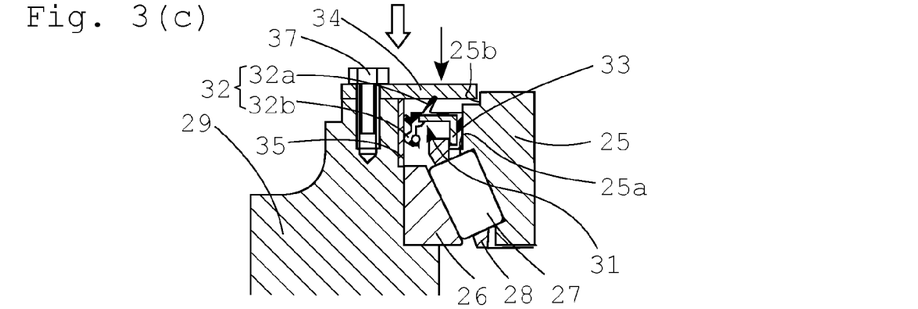

Thereafter, as shown in FIG. 3(c), the side plate 34 is fixed with bolts 37 to the end surface of the sprocket housing 29, so that the side lip 32a of the seal lip 32 is pressed against the side plate 34.

Figure 3D:
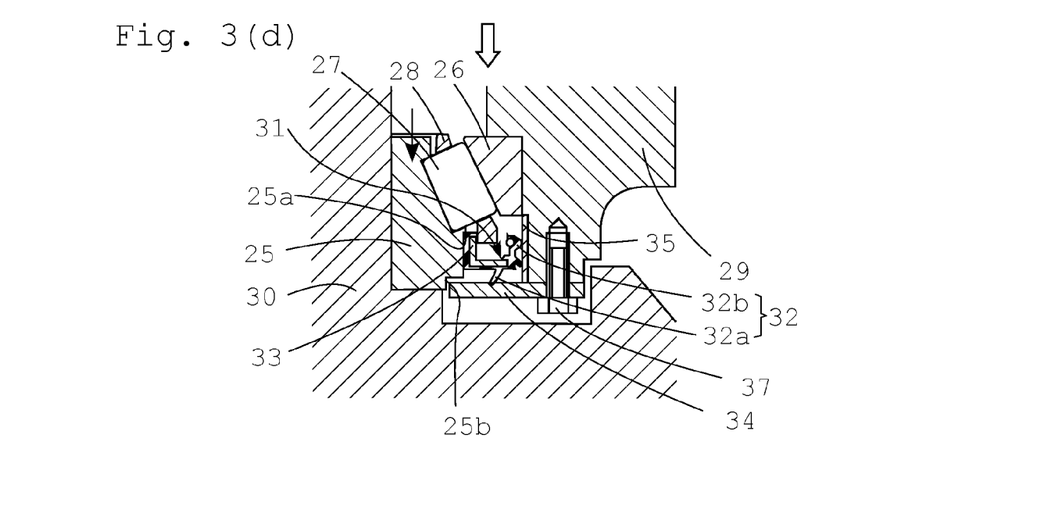

Once the state shown in FIG. 3(c) is achieved, the side plate 34 prevents the inner ring 25 from dropping even if the assembly is turned upside down. Thus, the assembly shown in FIG. 3(c) is turned upside down, and the inner ring 25 is assembled to the motor housing 30 as shown in FIG. 3(d). This completes the assembling of the sprocket bearing.

Figure 4:
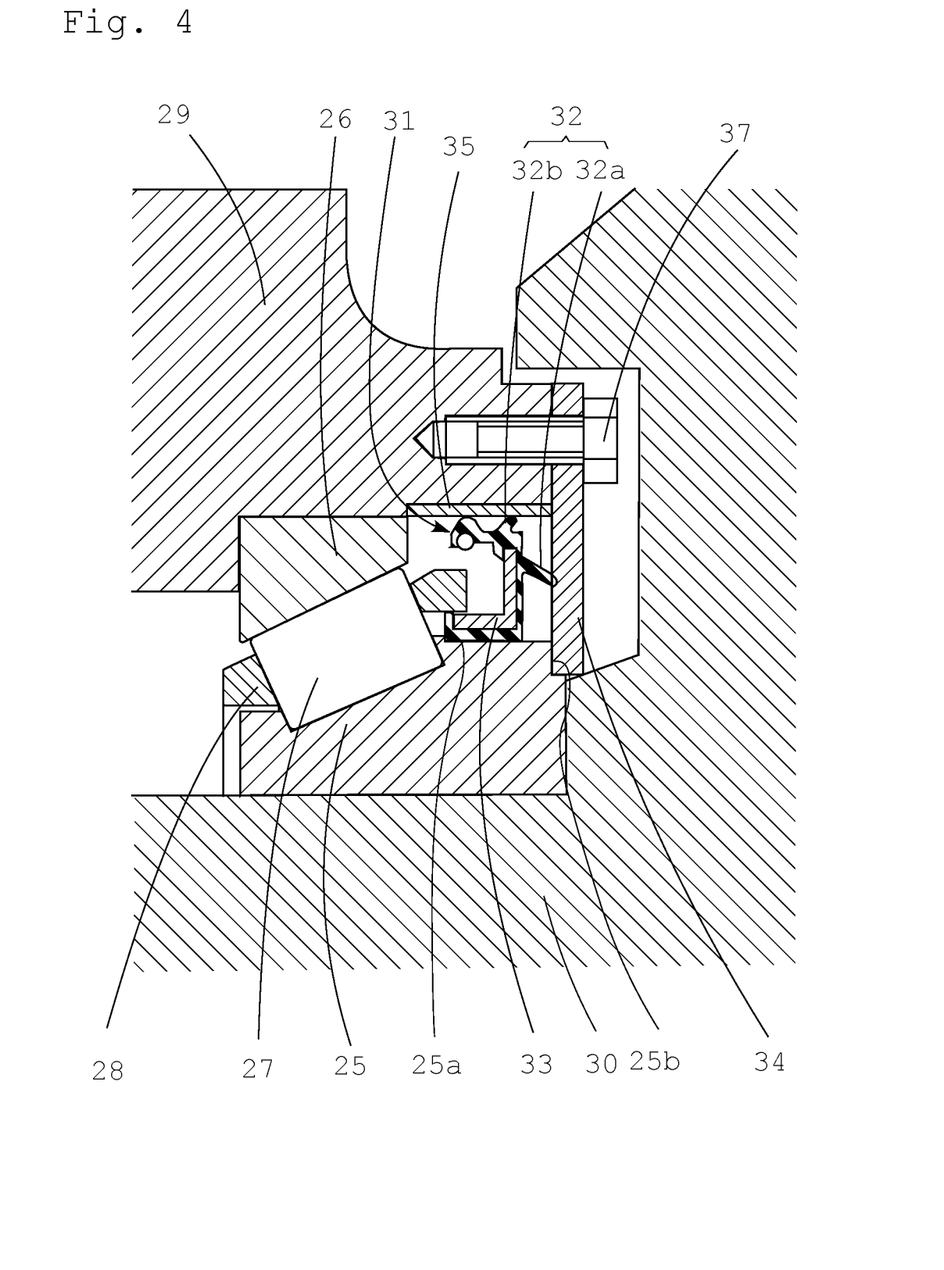
FIG. 4 is a partial enlarged sectional view of a rolling-bearing sealing device according to a second embodiment of the present invention.

FIG. 4 shows a sprocket bearing according to another embodiment which includes a side plate 34 having resin sliding member adhered onto its surface. This causes an inner end of the side plate 34 to make contact with a second step 25b of an inner ring 25, and there is no gap between the inner ring 25 and the side plate 34.

Figure 5:
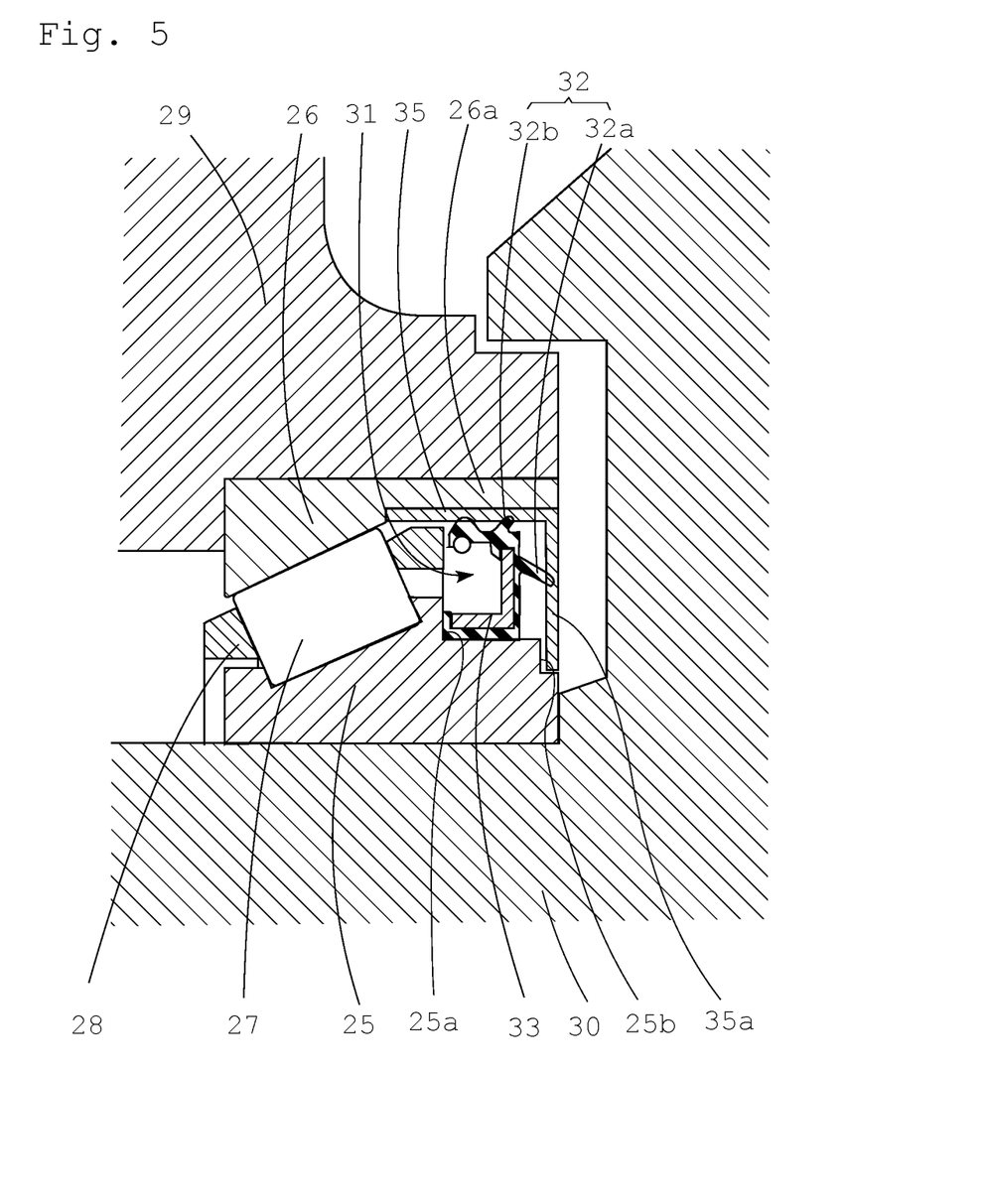
FIG. 5 is a partial enlarged sectional view of a rolling-bearing sealing device according to a third embodiment of the present invention.

FIG. 5 shows a sprocket bearing according to still another embodiment which includes an outer ring 26 having an extended width in the axial direction. The extension 26a is fitted with an L-shaped sleeve 35 which also serves as the side plate 34. The L-shaped sleeve 35 has its annular face 35a in pressing contact with a side lip 32a of a seal lip 32. The side plate 34 is omitted.

REFERENCE SIGNS LIST

24 Holding Plate
25 Inner Ring
25a First Step

25b Second Step
26 Outer Ring
26a Extension
27 Rolling Element
28 Retainer
29 Sprocket Housing
30 Motor Housing
31 Oil Seal
32 Seal Lip
32a Side Lip
32b Radial Lip
33 Slinger
34 Side Plate
35 Sleeve
35a Annular Face
36 Gap
37 Bolt

The invention claimed is:

1. A rolling-bearing sealing device comprising:
an outer ring fixed to a rotating sprocket housing;
an inner ring fixed to a non-rotating motor housing;
a plurality of rolling elements between the outer and the inner rings;
a retainer holding the rolling elements; and
an oil seal including a slinger and a seal lip and fixed to the inner ring;
wherein the seal lip of the oil seal is pressed against the outer ring or the sprocket housing for sealing a bearing space between the outer and the inner rings,
wherein the seal lip includes a side lip extended axially from the oil seal, and
wherein the sprocket housing has an end face provided with a side plate fixed thereto, for sliding contact by the side lip extended axially from the oil seal.

2. The rolling-bearing sealing device according to claim 1,
wherein the seal lip includes a radial lip extended radially from the oil seal, and
wherein the sprocket housing has an inner diameter surface provided with a sleeve for sliding contact by the radial lip extended radially from the oil seal.

3. The rolling-bearing sealing device according to claim 1, wherein the inner ring has an axial end portion formed with a step, and the step forms a labyrinth seal between itself and an inner diameter end of the side plate.

4. The rolling-bearing sealing device according to claim 1, wherein the side plate has a surface provided with a resin sliding member bonded thereto for contact between the inner ring and the side plate.

5. The rolling-bearing sealing device according to claim 1, wherein the side plate is bolted to the end face of the sprocket housing.

* * * * *